(12) United States Patent
Sadler

(10) Patent No.: US 7,177,077 B2
(45) Date of Patent: Feb. 13, 2007

(54) SUNSPOTTER SOLAR TELESCOPE

(75) Inventor: Philip M Sadler, Cambridge, MA (US)

(73) Assignee: Learning Technologies Inc., Somerville, MA (US)

( * ) Notice: Subject to any disclaimer, the term of this patent is extended or adjusted under 35 U.S.C. 154(b) by 0 days.

(21) Appl. No.: 10/606,469

(22) Filed: Jun. 25, 2003

(65) Prior Publication Data

US 2004/0027660 A1 Feb. 12, 2004

Related U.S. Application Data

(63) Continuation of application No. 09/812,115, filed on Mar. 14, 2001, now Pat. No. 6,614,593.

(51) Int. Cl.
*G02B 23/00* (2006.01)
*G02B 23/08* (2006.01)
*A47C 1/00* (2006.01)

(52) U.S. Cl. .................. 359/430; 359/399; 359/405

(58) Field of Classification Search ........ 359/399–431, 359/871–879; 434/284–303
See application file for complete search history.

(56) References Cited

U.S. PATENT DOCUMENTS

| | | | | |
|---|---|---|---|---|
| 2,753,760 A | * | 7/1956 | Braymer | ..................... 359/363 |
| D190,684 S | * | 6/1961 | Kennedy | ................... D16/132 |
| 3,603,664 A | | 9/1971 | James | ....................... 359/430 |
| 3,791,713 A | | 2/1974 | Mackay | ...................... 359/430 |
| D247,854 S | | 5/1978 | Simmons | ................... D16/132 |
| 4,437,736 A | | 3/1984 | Janosik, Sr. | |
| 4,470,672 A | | 9/1984 | Drauglis | ...................... 359/430 |
| 4,870,949 A | * | 10/1989 | Butler | ......................... 126/571 |
| 4,893,612 A | * | 1/1990 | Dawson | ...................... 126/689 |
| 5,416,632 A | * | 5/1995 | Carlisle | ....................... 359/399 |
| 5,489,142 A | | 2/1996 | Mathieu | ..................... 297/327 |
| 5,822,116 A | | 10/1998 | Leblanc | ...................... 359/430 |

* cited by examiner

*Primary Examiner*—Thong Q Nguyen
(74) *Attorney, Agent, or Firm*—Peter F. Corless; William J. Daley, Jr.; Edwards Angell Palmer & Dodge

(57) ABSTRACT

A solar telescope is disclosed that facilitates safe observation of the sun with minimal setup, targeting effort or operator skill. The folded solar telescope of the invention includes a friction stabilized telescope support system that is capable of maintaining a specified telescope orientation. The telescope further includes a targeting system that comprises one or more pointing aids to simplify the process of aligning the telescope with the sun so a solar image is projected onto a viewing surface.

19 Claims, 6 Drawing Sheets

SUNSPOTTER SOLAR TELESCOPE

CROSS-REFERENCE TO RELATED APPLICATION(S)

This application is a continuation of application U.S. Ser. No. 09/812,115, filed on Mar. 24, 2001, now U.S. Pat. No. 6,614,593.

FIELD OF INVENTION

The present invention relates to a solar telescope and more particularly to a folded-path telescope for projecting an image of the sun that can be easily aimed at the sun.

BACKGROUND OF THE INVENTION

Observing the sun using a telescope is fraught with difficulty. Direct vision can risk eye damage. Solar filters are often added to astronomical telescopes. These can fall off or crack due to the sun's heat, exposing the viewer's eye to the concentrated rays of the sun. In addition, astronomical telescopes are often large, unwieldy, hard to point and optimized for viewing dim objects at night. It is desirable to have a small, easy to use telescope that is as safe as possible. A telescope that can project a solar image onto a viewing surface allows users to observe sunspots and sketch drawings of the projected solar image onto a removable writing surface placed on the viewing surface.

A device is described in U.S. Pat. No. 4,437,736 wherein the sun viewing apparatus is a self-contained device consisting of a light shield with an aperture for admitting the rays of the sun and a series of pre-aligned lenses and prisms to display an image of the sun on a screen to reduce the threat of eye damage. This device suffers from difficulty in aligning the telescope with the sun and maintaining instrument alignment as the sun moves across the sky. In general, the sun moves through its own diameter across the sky in about two minutes, so frequent readjustment of the device is necessary to maintain a projected solar image. Adjusting the telescope alignment should be simple and easy to accomplish. However, this device does not provide simple means or methods for adjusting the telescope to the proper orientation for solar observation. Generally props must be placed beneath a corner of the instrument to tilt the telescope to the proper position in order to project an image of the sun.

Mounting systems for supporting a telescope are disclosed in U.S. Pat. Des. 247,854 wherein a portion of the telescope is in the form of a sphere that rests on a curved mount such that friction between the curved mount and the spherical telescope maintains the telescope orientation. The cylindrical portion of the telescope, which extends from the sphere, shifts the balance point of the telescope such that a significant amount of force is required to overcome the stabilizing friction to adjust the alignment of the telescope.

Another telescope and telescope support device is disclosed in U.S. Pat. No. 4,470,672 that describes a telescope with a large external ring attached to the side and end of a telescope, which acts as a mounting system for attachment of the telescope to a support. With the center of gravity adjusted to be close to the middle of the ring, the telescope is supposed to remain at a specified position at any azimuth or elevation. However, because the telescope center of mass is not located at the origin of the support ring additional mechanical devices are necessary to stabilize the telescope at certain elevations. The elevation of the telescope is maintained by friction. However, since the location of the telescope center of mass is variable depending on telescope elevation, the amount of stabilizing force e.g. friction necessary to maintain a specified elevation varies. Spring-loaded adjusters or other mechanical devices are disclosed to provide variable amounts of friction between the mounting ring and the telescope support device, sufficient to stabilize the telescope orientation. This system is complex; involving a large number of pieces and several adjustment points that increase the cost of the telescope, telescope size and the level of difficulty in using the telescope.

There is a need for a solar telescope that can be quickly and easily aligned with the sun such that an image of the sun is readily projected to a viewing screen. In addition, the telescope should have a support system that facilitates alignment and provides sufficient stability regardless of azimuth or elevation of the telescope.

SUMMARY OF THE INVENTION

The present invention features a solar telescope that facilitates safe observation of the sun with minimal setup, targeting effort or operator skill. The folded solar telescope of the invention includes a support system for controlling telescope elevation such that the center of gravity of the telescope and the origin of the circle described by the arc of the curved support device are substantially coincident. The telescope further includes a targeting system that comprises one or more pointing aids where multiple pointing aids have a variety of sensitivities to telescope alignment. Sequential application of pointing aids with increasing sensitivity to telescope alignment simplifies the target acquisition process, so that an image of the target (e.g. the sun) is projected onto a viewing surface by the telescope.

It is the object of this invention to provide a simple device that allows adults and children to more safely view the sun with a minimum of set-up time or adjustment. Further, the device is inexpensive to build, easy to maintain and optimized to solar viewing conditions.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 1:
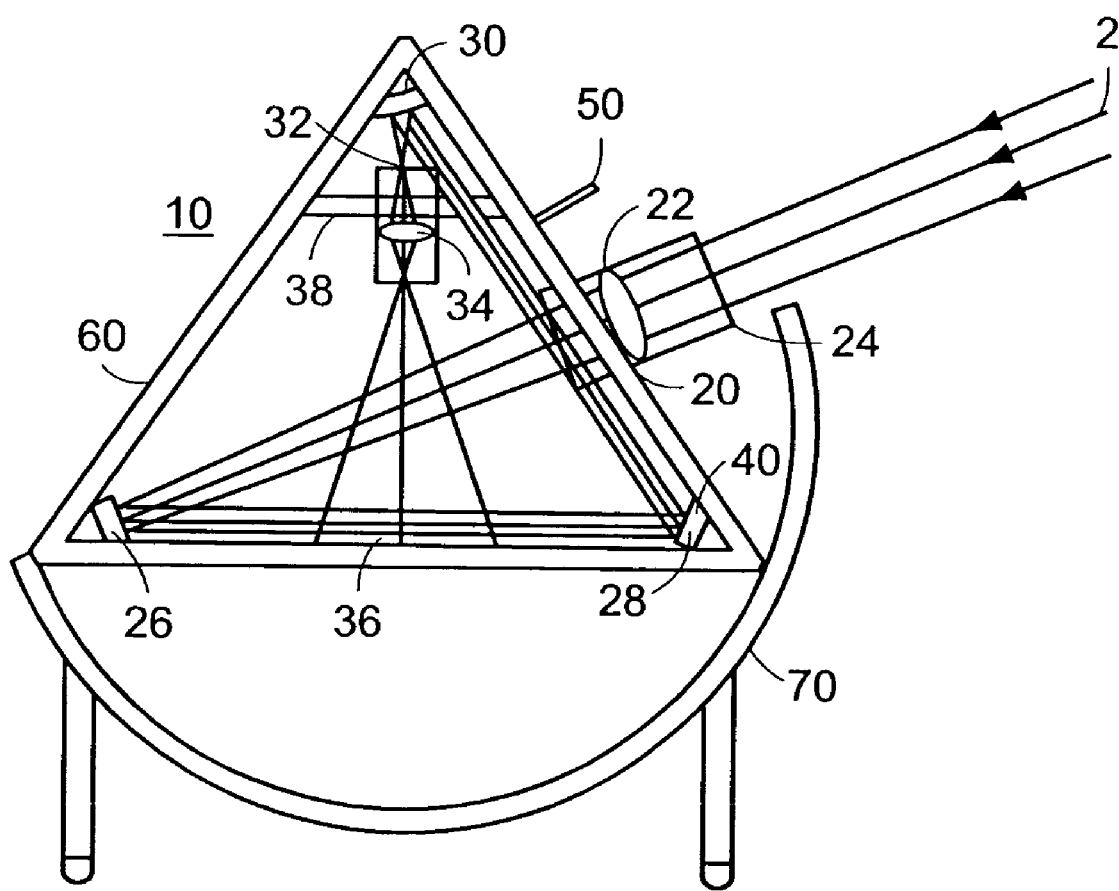
FIG. 1 is a side view of a triangular folded telescope in a triangular frame supported by a curved support device.

In specific embodiments, a folded solar telescope of the invention is housed in a frame whose shape is described by a regular n-sided polygon, where n is an integer greater than 2, such as an equilateral triangle, a square, and the like. The telescope comprises an objective lens, two or more mirrors or prisms to fold the path of the light, an "eyepiece" lens and a viewing screen. The telescope components are suitably mounted on the telescope frame or on braces or other support objects that are mounted to the telescope frame.

The regular polygonal telescope frame rests on a curved telescope support device where preferably the curvature of the support device's curved surface is defined by an arc of the circle that inscribes the regular polygon of the telescope frame. Preferably, the center of mass of the telescope is substantially coincident with the geometric center of the n-sided regular polygonal telescope frame. Further the center of mass of the telescope is substantially coincident with the origin of the circle that describes the curvature of the curved telescope support device because the origin of this circle is coincident to the center of the regular polygon of the telescope frame. The telescope's center of mass is substantially located at an energy minimum for any elevation of the telescope from 0° to 90°, thereby minimizing or eliminating rotational strain or torque on the telescope at virtually any telescope elevation. Consequently, a small amount of friction inherent to the contact between two or more apexes of the polygonal telescope frame with the curved surface of the telescope support device is sufficient to stabilize the telescope at a specified elevation. Additional stabilization aids such as clamps, spring rollers or other mechanical fasteners or tensioners are not required. Adjustment of the telescope elevation is simple to effect by overcoming the small amount of inherent static friction without the need for releasing or manipulating one or more stabilizing fasteners or tensioners.

The angular size of the sun is approximately ½° and pointing an instrument with a field of view of this size can be difficult. The present invention further includes a targeting system with one or more pointing aids to assist in adjusting the alignment of the telescope such that an object (e.g. the sun) is projected onto a viewing surface. The aiming process includes first pointing the telescope aperture and objective lens in the general direction of the sun. Additional telescope adjustment can include refining the alignment using a gnomon that is parallel to the axis defined by the center of the objective lens and the center of the first mirror or prism used for folding the path of the sun's rays. Minimizing or eliminating the shadow cast by the gnomon brings the telescope into closer alignment with the target e.g. the sun. More sensitive telescope orientation refinement can further include using a pointing target assembly where a secondary aperture and a target define an axis parallel to the axis defined by the center of the objective lens and the center of the first mirror or prism for folding the path of the sun's rays. Localizing the light rays from the secondary aperture onto the target brings the telescope further into alignment with the target e.g. the sun. The pointing target assembly is generally a more accurate targeting device than a gnomon. Preferred telescope alignment involves sequential orientation refinement steps with both a gnomon and a pointing target assembly to align the telescope with the sun to facilitate the projection of a solar image onto a viewing screen or surface.

In preferred embodiments, a gnomon or other geometrically regular object with one long dimension can be attached to the exterior of the telescope frame such that the gnomon is parallel to the axis defined by the center of the objective lens and the first mirror or prism. Preferably the long dimension of the gnomon or other regular object is parallel to the axis defined by the objective lens and the first mirror or prism. Adjusting the telescope orientation to eliminate the shadow cast by the gnomon brings the telescope into better alignment with the sun.

Preferred telescopes further comprise a second, more sensitive targeting assembly. A second aperture with a relatively small diameter is located in close proximity to the primary telescope aperture on the telescope frame. Additionally, the telescope has a pointing target mounted within the interior of the telescope frame. The pointing target is located so the line between the center of the target and the center of the second aperture is substantially parallel to the axis defined by the primary aperture and the first light-folding component e.g. mirror or prism. Localizing the light beam from the second aperture on the pointing target causes the light passing through the objective lens to contact the first light-folding mirror bringing the telescope into closer alignment with the target e.g. the sun.

For telescopes that include both a gnomon and a pointing target orienting apparatus, the distance between the second small aperture and the pointing target is preferably between 2 and 20 times the length of the gnomon. More preferably the distance is between about 4 and 12 times the length of the gnomon. Consequently the sensitivity of the pointing target pointing aid is more sensitive than the gnomon pointing aid by a factor of about 2 to about 8.

In additional embodiments, targeting methods are included whereby the elevation and azimuth of the telescope are adjusted according to one or more targeting steps to facilitate image acquisition of a specified target, e.g. the sun. The first rough telescope orientation is to set the approximate azimuth by orienting the telescope so that the frame is pointing towards the target. The first refinement is accomplished by adjusting the elevation and azimuth of the telescope so that the shadow cast by a gnomon is minimized or preferably eliminated. Additional, more sensitive refinement of the telescope orientation is accomplished by adjusting the elevation and azimuth of the telescope so that the beam of light passing through the second small aperture strikes the center of the pointing target. The pointing target based telescope orientation adjustment is about 2 to 8 times more sensitive than the gnomon-based adjustment. Preferably the pointing target refinement is about 3 to 5 times more sensitive than the gnomon-based adjustment. Final telescope orientation is accomplished by centering the target image, e.g. an image of the sun, on the viewing surface.

Referring now to the various figures of the drawing wherein like reference characters refer to like parts, there is shown in FIG. 1, a folded solar telescope, 10, wherein the equilateral triangular telescope frame 60 has an aperture 20 to admit the sun's light 2. In line with the aperture is the telescope's objective lens 22 mounted in a tube 24. The sun's rays 2 pass through the objective lens 22 into the enclosure (not labeled). The larger the diameter of the lens 22, the brighter the image projected onto the viewing surface 36. The lens can be an achromat, corrected for chromatic aberration and/or other optical defects. The path of the sun's rays 2 are then folded by at least two or preferably three mirrors or prisms 26, 28, and 30 within the telescope frame enclosure to bring them to a focus 32. A curved mirror 30 can be used to act as a focusing and reflecting element together as in a Newtonian telescope. After the primary focus, the rays pass through an "eyepiece" lens 34 that magnifies the image. Alternatively, in a Gallelian telescope design, the eyepiece 34 is located before the focal point 32.

The mirrors or prisms 26, 28 and 30 that fold the path of the light rays passing through the objective lens 22 are sufficiently large to reflect or fold all of the light rays originating in the objective lens. Consequently, the mirrors or prisms diminish in size after each folding or reflecting step as the light rays becomes more concentrated and their cross-section diminishes. Scaling the mirror or prism size to reflect the cross-sectional area of the light rays decreases the weight and cost of the telescope.

The mounting position of optical elements 26, 28, and 30 within the telescope frame can be changed to any suitable combination of positions that facilitate focusing the projected image upon a viewing screen 36. In situations where the telescope is used to view extremely distant objects, e.g. the sun, a fixed focal point is sufficient to render a clear image on the viewing surface. Changes in the distance between the sun and the observing solar telescope due to different observation locations and even seasonal fluctuations in the distance between the sun and earth are relatively small variations in the overall focal distance and do not effect the clarity of the image projected by preferred telescopes of the invention. Consequently the optics, e.g. mirrors or prisms 26, 28 and 30 and lenses 22 and 34, of the present invention are preferably mounted without adjustment mechanisms. Fixed optical elements reduce the possibility of operator-induced misalignment of the telescope, and lowers the manufacturing cost of the telescope.

After the primary focus 32, the rays pass through an "eyepiece" lens 34 that magnifies the image and projects the solar image upon a viewing screen 36. The screen 36 is placed internal to the telescope frame and can be viewed from the sides of the apparatus. The viewing surface 36 is preferably a substantially flat surface that can register an aberration free image of the target. Non-limiting preferred viewing surfaces can include a painted surface, an opaque homogenous film, a sheet or pad of paper, or the like. Preferable viewing surfaces exhibit good reflective qualities to facilitate visibility of the projected image.

In specific embodiments of the invention, the addition of at least one optical filter or mirror or series of filters 40 can be employed to reduce chromatic aberration and/or to increase image quality. Preferred optical filters include yellow and green filters that increase image contrast by removing blue light, which is considerably scattered in the sky. Incorporation of inexpensive optical filters improves image contrast and reduces the need for more expensive achromatic lenses to obviate optical aberrations in the projected image.

In particular embodiments, one or more mechanical fasteners 42 are located around the periphery of the viewing surface to stabilize a sheet or a pad of paper or the like in the viewing area such that a drawing of the projected solar image can be sketched or drawn by an observer. Preferred fasteners 42 include clips or tension devices constructed preferably from metal or a polymeric material such as a polyolefin or other plastic that holds the drawing surface, e.g. paper, in place on the viewing surface.

Folded solar telescopes of the invention further preferably comprise one or more safety precautionary devices or systems to prevent unintentional exposure of an observer to intense, concentrated solar radiation that include: i) the use of heat absorbing elements, particularly optical elements such as lenses, mirrors, prisms or filters and other components that are exposed to intense concentrated light rays; ii) physical enclosures surrounding areas with intense concentrated radiation such as the focal point 32 and the area between and surrounding the light path from mirror 30 and focal point 32; preferential use of folded Newtonian telescope design wherein the focal point 32 is located between mirror 30 and "eyepiece" lens 34 is the constrained triangular space delineated by the brace 38 and the frame apex where mirror 30 is mounted; iv) the use of folding prisms 26, 28 30 which bring UV and IR light to less of a concentrated focus than using focusing mirrors 26, 28 and 30. In addition, the enclosure defined by the telescope frame 60 should be small enough so that a user cannot place his or her head inside to prevent damage to the user's eyes.

In preferred embodiments of the invention, telescope frame 60 shapes include but are not limited to regular polygons such as equilateral triangle, square, pentagon, and the like. The center of mass of the telescope is substantially coincident with the geometric center of the n-sided regular polygonal telescope frame. The localization of the center of mass of the telescope 10 and the telescope frame 60 to the geometric center of the polygonal telescope frame can optionally be effected by addition of one or more balancing weights to the telescope frame. The vertices of the regular polygonal telescope frame 60 describe a circle. The curvature of the inscribed circle defines the curvature of the curved surface or cradle of the telescope support device 70 on which the telescope frame 60 rests. The center of mass of the telescope is substantially coincident with the origin of the circle that describes the curvature of the curved telescope support device because the origin of this circle is coincident to the center of the regular polygon of the telescope frame. Further the telescope's center of mass is substantially located at an energy minimum for any elevation of the telescope from 0° to 90° thereby minimizing or eliminating rotational strain or torque on the telescope at virtually any telescope elevation. Consequently, the inherent friction arising from contact of two or more apexes of the polygonal telescope frame with the curved surface of the telescope support device is sufficient to stabilize the telescope at a specified elevation. The likelihood of the telescope shifting position after alignment is thereby greatly reduced.

Additional stabilization aids such as clamps, spring rollers or other mechanical fasteners or tensioners that are necessary in other support systems, e.g. the embodiments of U.S. Pat. No. 4,470,672, are not required in the present invention. Adjustment of telescope elevation is simple to effect by overcoming the small amount of friction inherent to the contact of the telescope frame and the telescope support device without the need for releasing or manipulating one or more stabilizing fasteners or tensioners. More specifically, the friction resulting from contact of the vertices of the telescope frame with cradle of the support device and the location of the center of gravity for the telescope stabilizes the telescope at any specified elevation.

The present invention preferably includes a method of aligning a solar telescope of the invention with the sun so that an image of the sun is accurately projected onto a viewing surface. The angular size of the sun is approximately ½° and pointing an instrument with a field of view of this size can be difficult. The method includes the steps of i) observing one or more pointing aids of the telescope 10; ii) adjusting the orientation of the telescope in reference to alignment information acquired in step i) to bring the telescope into alignment with the sun; and iii) repeating steps i) and ii) until the telescope projects a solar image onto the viewing screen.

In preferred embodiments of the present invention, the solar telescope 10 is aligned with the sun by using a gnomon 50 to properly orient the telescope so an image of the sun is projected onto a viewing surface. A telescope is initially placed on a surface so the objective lens 22 and gnomon 50 are facing in the general direction of the sun. The gnomon 50 blocks the sun's rays 2 and casts a shadow upon the surface of the telescope frame 60. The direction of the shadow is a composite of the elevation and azimuth misalignment of the telescope 10 with the sun. Azimuth misalignment results in a horizontal component to the shadow, e.g. the shadow is slanted to the right or left of the telescope frame and elevation misalignment results in a vertical component to the shadow, e.g. the shadow is cast above or below the gnomon 50. By observing the horizontal component shadow cast by the gnomon 50, the direction and magnitude of azimuth adjustment can be obtained. The telescope 10 and telescope support device 70 are jointly rotated until the shadow cast by the gnomon is parallel to the edges of the telescope frame 60, e.g. the shadow is directly above or below the gnomon 50. By observing the vertical gnomon shadow, the direction and magnitude of elevation adjustment can be obtained. The telescope elevation is adjusted accordingly by rotating the telescope frame 60 on the curved telescope support device 70 until the shadow cast by the gnomon is substantially eliminated. Additional iterations of gnomon observation and telescope adjustment can be used to further improve the alignment of the telescope 10 as needed for the telescope to project a solar image onto the viewing screen 36.

Also suitable are gnomon-based telescope alignment methods wherein both the azimuth and elevation of the telescope are adjusted after a single observation of the shadow cast by the gnomon. Multiple observation and/or adjustment steps may be necessary to iteratively minimize or eliminate the shadow cast by the gnomon.

In other preferred embodiments of the present invention, the solar telescope 10 is aligned with the sun by using a pointing target to properly orient the telescope so an image of the sun is projected onto a viewing surface. A telescope is initially placed on a surface so the objective lens 22 and gnomon 50 are facing in the general direction of the sun. Light rays 2 are admitted through a secondary aperture 52 located in close proximity to the primary aperture 20 and objective lens 22 assembly. The admitted light strikes the interior surface of the telescope frame 60 opposite from the secondary aperture. By observing the location where the admitted light strikes the interior of the frame relative to a pointing target, the direction and magnitude of azimuth and elevation corrections can be determined. The azimuth and the elevation of the telescope are adjusted sequentially or concomitantly based on the relative location of the light contacting the telescope frame until the admitted light strikes the pointing target thereby bringing the telescope into alignment with the sun.

In particularly preferred embodiments of the present invention, a solar telescope 10 is aligned with the sun by using in sequence the gnomon and the pointing target methods above described. First the gnomon-based method for telescope alignment is employed to point the telescope in the general right direction of the sun. More accurate and sensitive telescope alignment is then effected by the pointing target method to point the telescope toward the sun. Final telescope alignment is effected by minor adjustment of telescope elevation and azimuth to center the projected solar image on the viewing surface.

In preferred embodiments the pointing target alignment apparatus is about 2 to 8 times more sensitive to telescope orientation than the gnomon-based alignment apparatus. More preferably, the pointing target apparatus is about 3 to 5 times more sensitive than the gnomon-based apparatus. When they are used sequentially, the combined telescope alignment method can greatly facilitate telescope alignment.

In preferred embodiments the support device 70 and the telescope frame 60 have a locking mechanism (not shown) and a locked position whereby the support device and telescope are physically locked together to facilitate transport and to minimize the possibility of damaging the telescope. Preferred locking mechanisms of the invention can include mechanical fasteners such as metal or plastic hook and eye, straps made of rubber, plastic or fabric, Velcro™ (fabric hook and loop fasteners) and the like.

Preferred telescope frames are constructed from wood preferably plywood with between 3 and 8 laminated layers and/or a thickness of about ¼ to 1 inch. More preferably the plywood frames are constructed from ½ to ¾ inch thick rectangular plywood pieces. The assembled telescope frame is constructed by gluing, mechanically fastening, or a combination of gluing and mechanically fastening the rectangular plywood pieces into the correct geometric shape for the telescope frame, e.g. an equilateral triangle, a square or the like.

Preferred curved telescope support devices are constructed from a rectangular piece of laminated plywood that has been bent or shaped so that plywood has a curved surface along the long dimension of the rectangle where the curvature is described by an arc of the circle that inscribes the telescope frame. Particularly preferred curved telescope support devices are constructed from a semicircular section of a plywood cylinder such as the plywood cylinders used in the fabrication of drums, such as snare drums.

In preferred embodiments of the present invention the telescope frame and the telescope support device are constructed from plywood. However, other suitable materials for the construction of the telescope frame and support device are also within the scope of the invention. Non-limiting examples include other wood sources including wood both solid and composite wood materials, plastic such as thermoplastics, polyolefins and other polymeric materials, metal such as aluminum, steel, brass and other metals and alloys, ceramics, composite materials such as fiberglass and the like. Telescope, 10, including the telescope frame 60 or 62 and the telescope support device 70 or 72 that are constructed from materials other than wood may preferentially be constructed by other methods that are appropriate for different construction materials as is well known in the art.

In certain aspects of the invention, additional flanges or braces (not shown) can be attached to the telescope frame 60 or to the curved telescope support device 70 to increase the rigidity of the telescope frame and/or the curved telescope support device. Additional flanges and braces and can be composed of a variety of materials including wood such as solid wood or composite wood materials, plastics such as thermoplastics, polyolefins and other polymeric materials, metal such as aluminum, steel, brass and other metals and alloys, composite materials such as fiberglass. Preferably flanges are substantially composed of wood or plastic. Preferable braces are constructed from wood, metal or a plastic.

Figure 2:
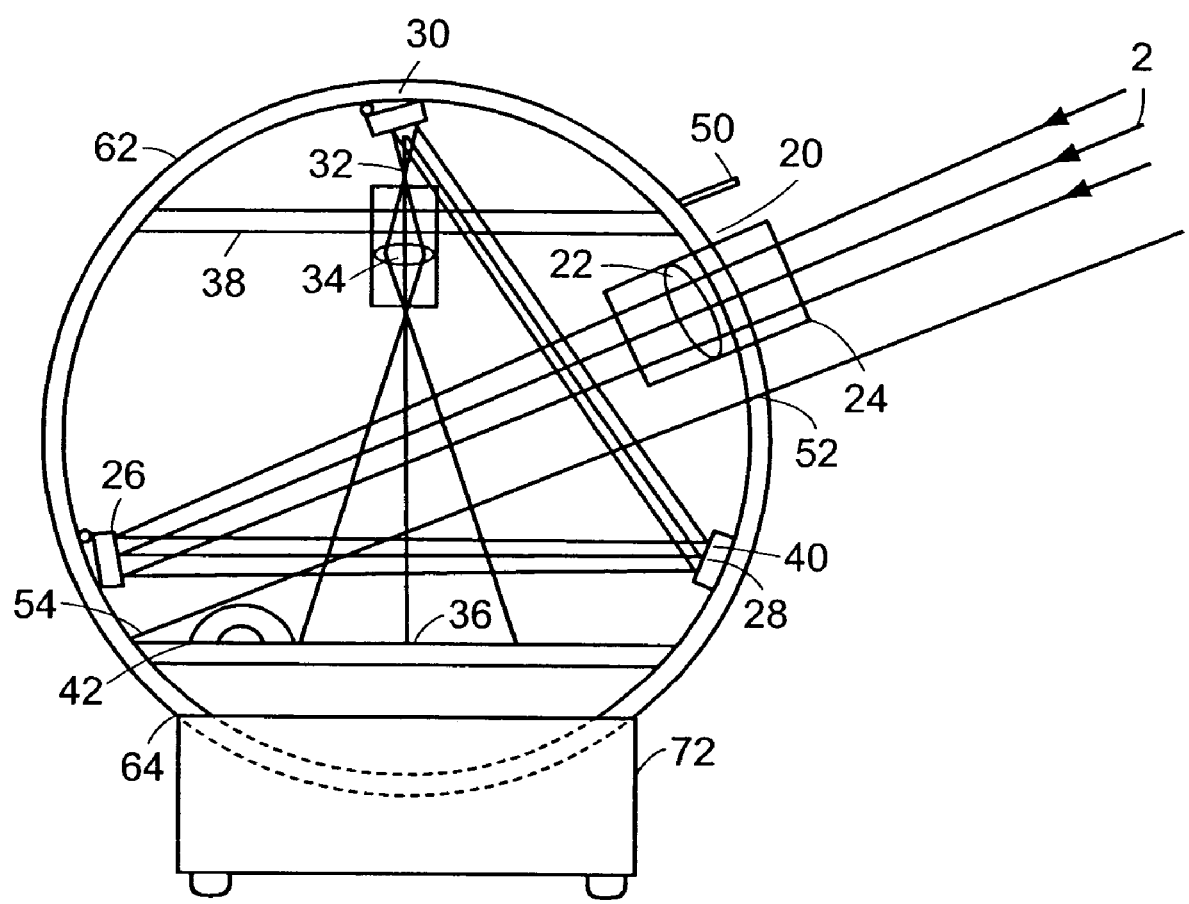
FIG. 2 is a side view of a triangular folded telescope in a circular frame supported by a circular support device.
Figure 3:
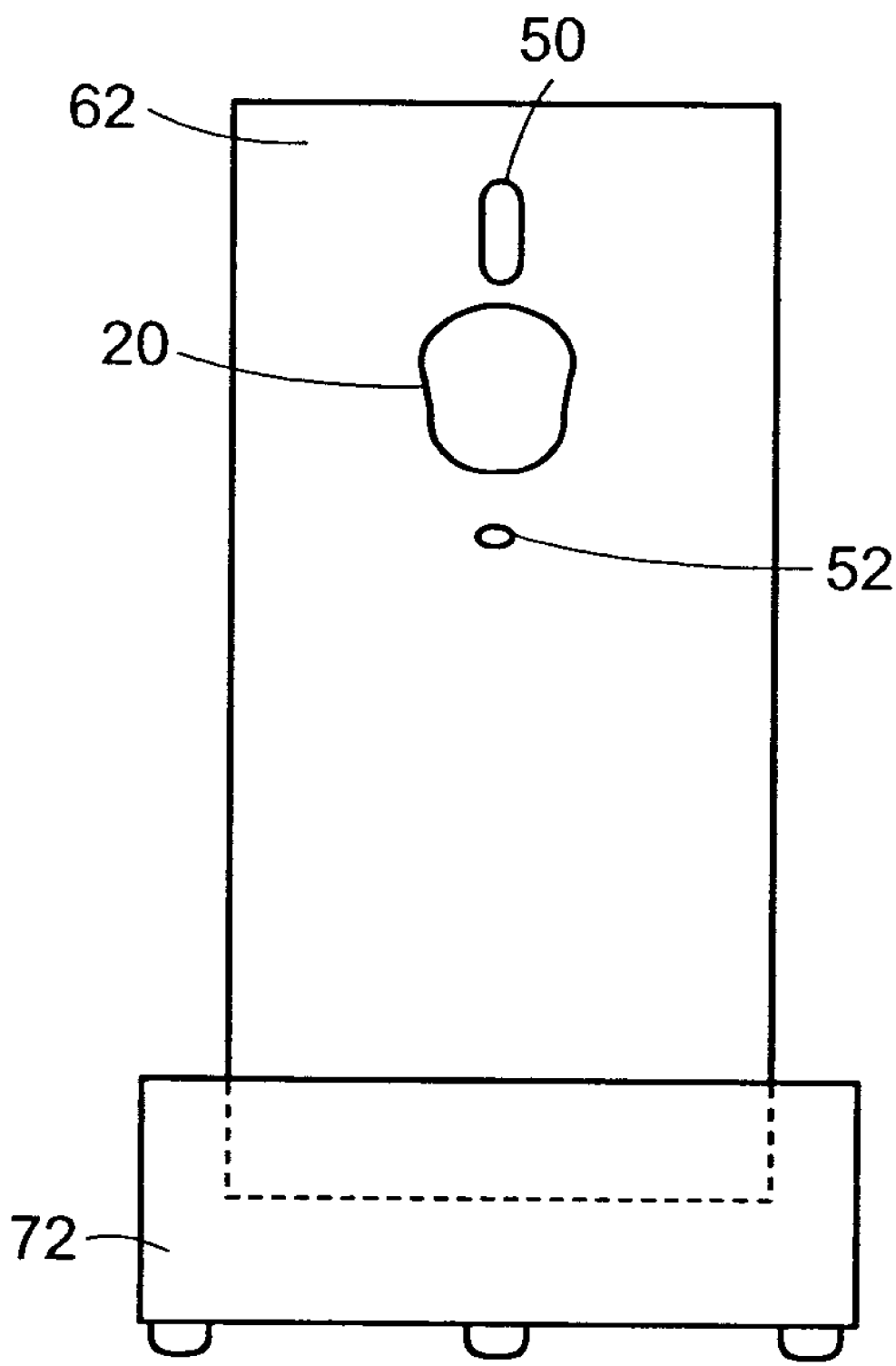
FIG. 3 is an end view of a triangular folded telescope in a circular frame supported by a circular support device.
Figure 4:
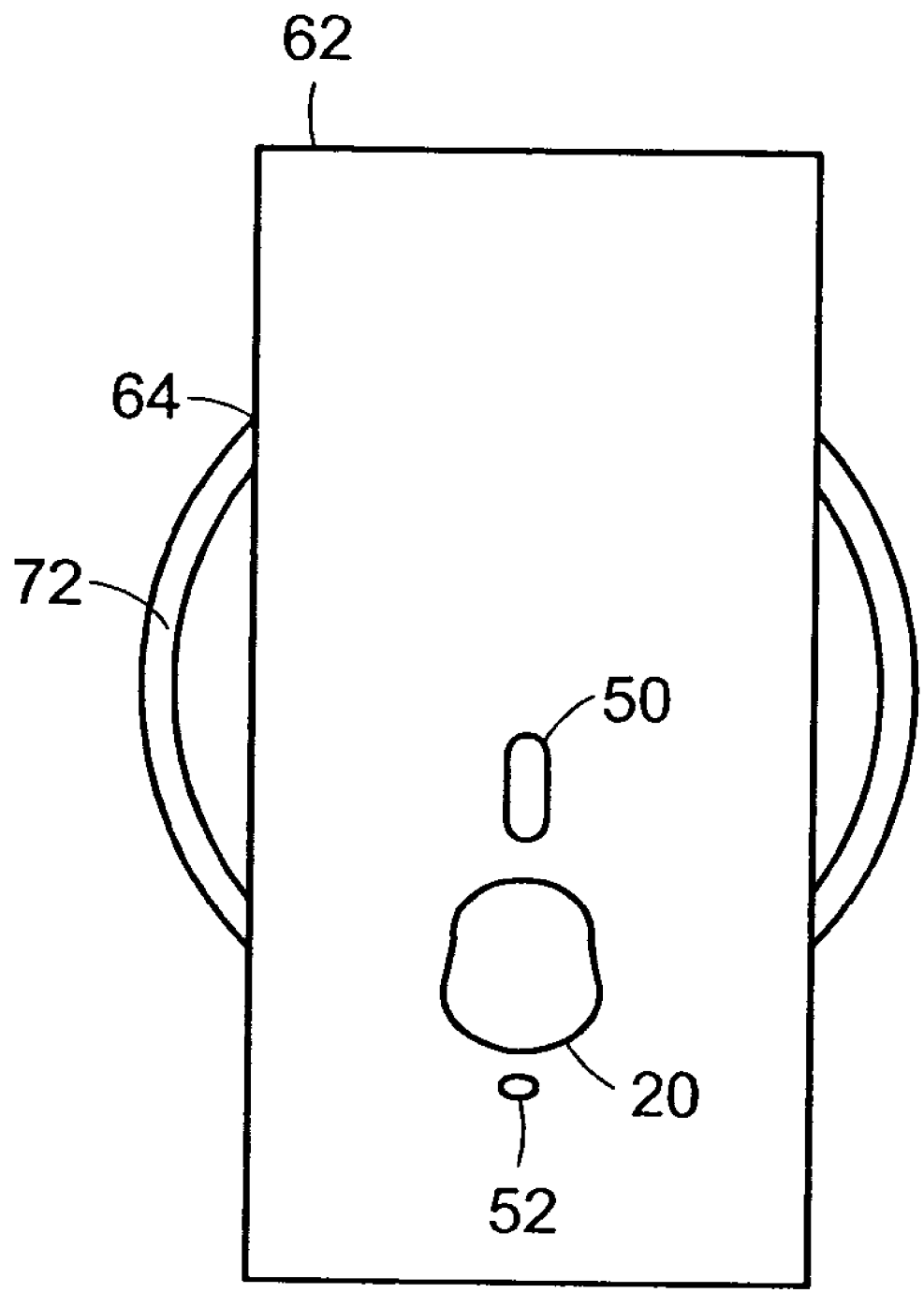
FIG. 4 is a top view of a triangular folded telescope in a circular frame supported by a circular support device.
Figure 5:
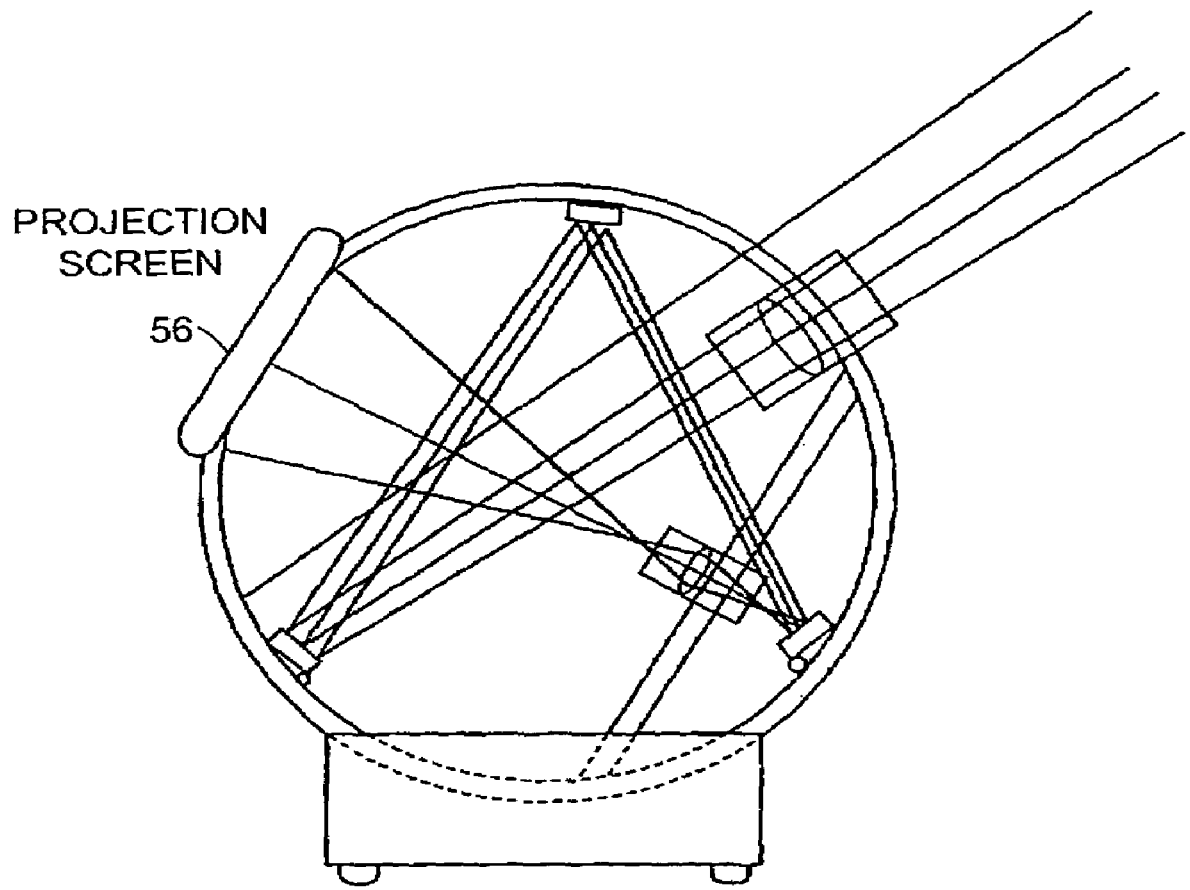
FIG. 5 is a side view of a triangular folded telescope projecting a solar image onto a projection screen.

In specific embodiments of the invention, the folded solar telescope 10 is housed in a cylindrical frame 62 and the base telescope support device 72 is a horizontal cylinder, as shown in FIG. 2, FIG. 4, and FIG. 5. Thus, in FIG. 2, FIG. 4, and FIG. 5, the telescope support device is a cylinder with a smaller diameter than the diameter of the cylindrical telescope frame and the axis of the cylindrical telescope support device is perpendicular to the axis of the cylindrical telescope frame. Changing the unit's azimuth can be achieved by shifting the orientation of the cylindrical telescope frame 62 in the base telescope support device 72. Edges of both cylinders are chamfered 64 to a complementary angle or otherwise shaped to approximate the tangent of the enclosed sphere. The chamfered cylinder edges enlarge the contact area between the telescope frame and the telescope support device thereby stabilizing the telescope and simplifying the process of aligning the telescope with the sun.

The angular size of the sun is approximately ½° and pointing an instrument with a field of view of this size can be difficult. Pointing can be aided by different means of alignment. A gnomon 50 of about ½ to about 4 inches in length can be used for initial alignment wherein minimizing the shadow cast by the gnomon 50 refines the telescope orientation. Finer telescope alignment can be achieved through the use of a pointing target comprising locating the light rays passing through a small, second aperture 52 onto a pointing target 54 in the interior of the telescope frame 62. Final telescope adjustment is achieved by centering the projected solar image onto the viewing surface 36. The pointing target alignment step is about 2 to about 10 times more sensitive or preferably about 3 to about 5 times as sensitive as the gnomon alignment step so that a series of increasingly sensitive alignment process can be used to point the telescope precisely at the target.

In preferred embodiments of the invention, a gnomon 50, which can suitably include objects that have a regular geometry such cylinders and regular polygonal prisms including triangular or rectangular prisms, is attached to the exterior of the telescope frame 62. Preferred gnomons have one dimension that is at least about 3 times greater than the other dimensions. More preferred are gnomons 50 where the long dimension is about 4, 6, or 8 times greater than the other dimensions. The long dimension of the gnomon is parallel to the line defined by the center of the primary aperture 20 and the center of the first reflection mirror 26. In a non-limiting example, a cylindrical gnomon 50 with a circular cross-section has a height that is about 8 times larger than the diameter of the circular cross-section, e.g. a dowel that is ¼ inches in diameter and 2 inches long.

In additional preferred embodiments of the invention, the telescope frame 62 includes a targeting system that comprises a second aperture 52 that is smaller than aperture 20 and a pointing target 54 mounted on the interior of the telescope frame 62. The diameter of the secondary aperture 52 is preferably about ¹⁄₁₆ to about ½ inches and more preferably about ⅛ to about ¼ inches. The pointing target 54 is located within the interior of the telescope frame such that the line between the pointing target and the center of the secondary aperture is parallel to the line defined by the center of the primary aperture 20 and the center of the first reflecting mirror or prism 26. The distance between the secondary aperture 52 and the pointing target 54 is between about 6 and about 16 inches depending on the size of the telescope. Preferably, the distance is between about 8 and 12 inches. Larger telescopes can have larger secondary apertures 52 and a larger distance separating the aperture and the pointing target 54.

In particularly preferred embodiments of the present invention, a folded solar telescope includes both a gnomon 50 and a pointing target telescope alignment device to facilitate target acquisition by an operator. Sequential use of both the gnomon 50 and the pointing target 54 to sequentially refine the orientation of the telescope 10 such that the multiple step targeting method minimizes the amount of time spent initially targeting the telescope and the amount of time spent in realigning the telescope to track the sun as it travels across the sky.

Figure 6:
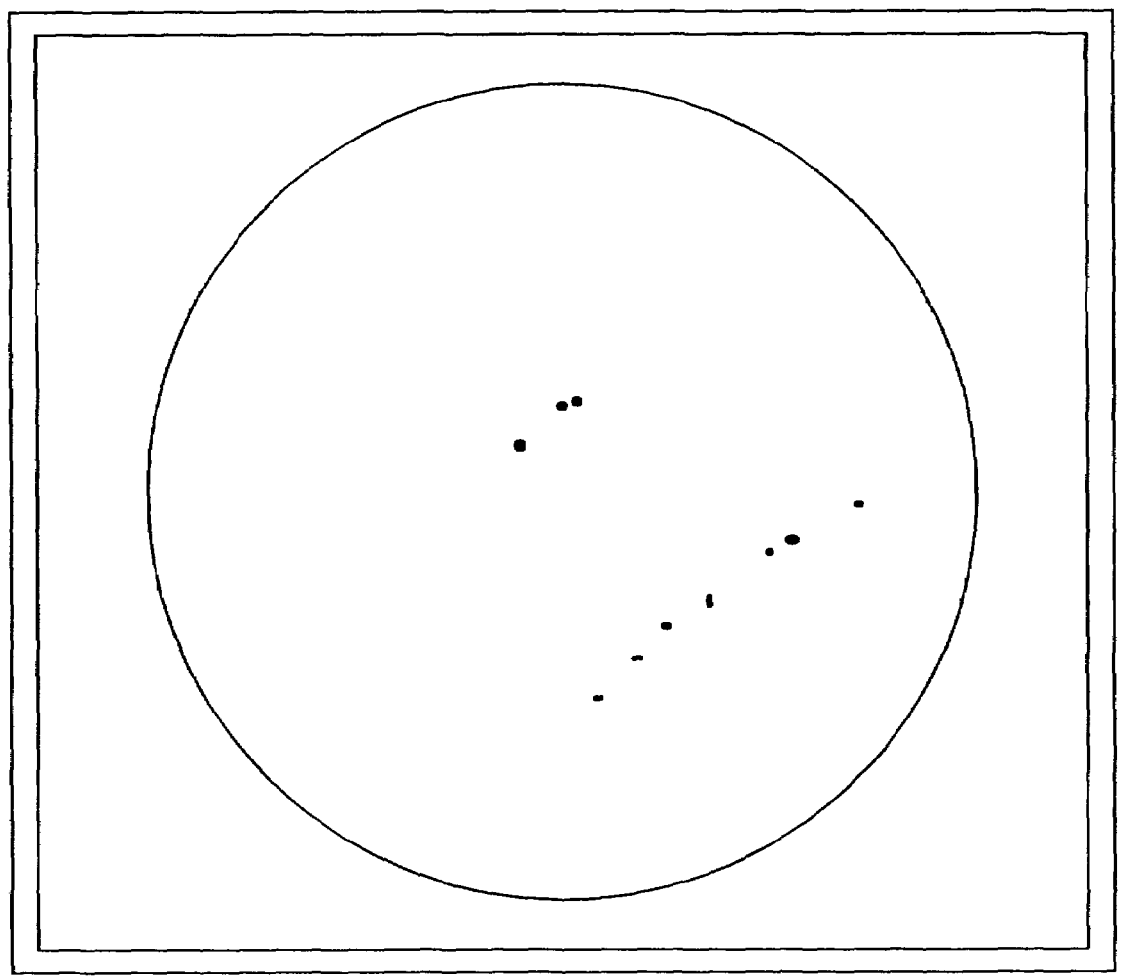
FIG. 6 is a photograph of the projected solar image produced by a folded solar telescope of the present invention.

A preferred embodiment of the present invention includes a folded solar telescope 10 housed within an equilateral triangular telescope frame 60 with 12 inch sides that rests in a semicircular cradle with about a 14 inch inside diameter of a curved support device 70. An objective lens 22 of 700 mm focal length and 60 nm diameter is paired with a Plössl eyepiece of 12.55 mm focal length and a 12 mm lens diameter. This combination of optical lenses results in a total path length of about 875 mm and a projected solar image of about 100 mm. The first reflecting mirror 26 is about 40 mm square, the second mirror 28 is about 25 mm square and the third mirror 30 is about 15 mm square. The approximate magnification of the folded solar telescope described herein if used conventionally is 56×, well within the range of capabilities of conventional optics. The resolving power of the telescope is sufficient to see small sunspots as illustrated in FIG. 6.

In specific embodiments, the telescope-viewing surface is a projection screen 56, as shown in FIG. 5, that is located such that an image projected onto the surface of the viewing screen on the interior of the telescope frame is visible from the exterior of the telescope. Preferred projection screens comprise a translucent material such as a piece of translucent or frosted glass, a translucent polymer film, or the like. The projected image is then visible from outside of the telescope frame. The projection of the image to an exterior telescope frame surface facilitates target observation, such as solar observation, by one or more people without the risk of exposure to concentrated solar radiation. Solar observation by a large group of people, e.g. 2, 3, 4, 5, 6, or more people, is particularly facilitated by the projection of the solar image onto a projection screen.

Although a preferred embodiment of the invention has been described using specific terms, such description is for illustrative purposes only, and it is to be understood that changes and variations may be made without departing from the spirit or scope of the following claims.

What is claimed is:

1. A folded solar telescope suitable for safely observing an image of the sun, the telescope comprising:
    a folded telescope assembly that comprises an objective lens, at least two light folding devices, a second lens, and a projection surface;
    a telescope frame having an exterior cross-section which is a circle or polygon and in which the telescope assembly is mounted;
    a curved support device wherein the curvature of the curved support device supports the telescope frame and permits adjustment of telescope altitude; and
    a translucent screen that is structured and arranged so that an image of the sun projected onto the translucent screen is visible from an opposite face of the screen from the objective lens, the at least two light folding devices, and the second lens, wherein the image is observable from the exterior of the telescope frame.

2. A telescope according to claim 1 wherein the light folding devices are mirrors or prisms.

3. The folded solar telescope of claim 1 wherein the telescope frame is supported by the telescope support device such that the center of gravity of the telescope is unaffected by changing the elevation of the telescope.

4. A telescope according to claim 3 wherein the telescope elevation can be varied from 0° to 90°.

5. A telescope according to claim 3 wherein the exterior cross-section of the telescope frame is a circle which inscribes the dimensions of the folded telescope assembly.

6. A telescope according to claim 5 wherein the telescope support device is a cylinder with a smaller diameter than the diameter of the cylindrical telescope frame and the axis of the cylindrical telescope support device is perpendicular to the axis of the cylindrical telescope frame.

7. A telescope according to claim 1, wherein the friction between the telescope frame and the support device is sufficient to stabilize the telescope at a specified elevation.

8. A telescope according to claim 1, wherein the shape of the telescope frame is a regular polygon.

9. A telescope according to claim 8 wherein the telescope support device comprises a curved surface on which the telescope frame is supported, the curvature of the telescope support device surface is defined by an arc of a circle that inscribes the polygonal shape of the telescope frame.

10. A telescope support device according to claim 9 wherein the arc defining the curvature of the telescope support device is a semicircle.

11. A telescope according to claim 1, wherein the shape of the telescope frame is an equilateral triangle.

12. The telescope according to claim 1, wherein the telescope further comprises a telescope pointing system comprising one or more visual guides wherein the visual guides are integral to the telescope such that the axis or line defined by each guide apparatus is parallel to a line defined by the center of the objective lens and one of the light folding devices.

13. The telescope according to claim 12, wherein the pointing system comprises a gnomon that has a long dimension oriented parallel to the rays of light that pass through the objective lens and are folded by the light folding devices.

14. The telescope according to claim 12 wherein the pointing system comprises:
   a secondary aperture for admitting a small cross-sectional beam of light; and
   a pointing target located within the telescope such that the line defined by the pointing target and the secondary aperture is parallel to the rays of light that pass through the objective lens and strike the first mirror or prism.

15. The telescope according to claim 12 wherein the pointing system comprises:
   a gnomon which has a long dimension oriented parallel to the rays of light that pass through the objective lens and strike the first mirror or prism;
   a secondary aperture for admitting a small cross-sectional beam of light; and
   a pointing target located within the telescope such that the line defined by the pointing target and the secondary aperture is parallel to the rays of light that pass through the objective lens and strike the first mirror or prism.

16. A folded solar telescope suitable for safely observing an image of the sun, the telescope comprising:
   a folded telescope assembly that comprises two or more light folding devices, wherein the light folding devices are mirrors or prisms;
   a telescope frame having an exterior cross-section which is a circle or polygon and in which the telescope assembly is mounted;
   a curved support device wherein the curvature of the curved support device supports the telescope frame and permits adjustment of telescope altitude; and
   a translucent screen that is structured and arranged so that an image projected onto the translucent screen is visible from an opposite face of the screen from the two or more light folding devices, wherein the image is observable from the exterior of the telescope frame.

17. The telescope according to claim 16, wherein the telescope further comprises a telescope pointing system comprising one or more visual guides wherein the visual guides are integral to the telescope such that an axis or line defined by each guide apparatus is parallel to a line defined by a center of the objective lens and one of the light folding devices.

18. The telescope according to claim 17, wherein the pointing system comprises a gnomon that has a long dimension oriented parallel to the rays of light that pass through the objective lens and are folded by the light folding devices.

19. A folded solar telescope suitable for safely observing an image of the sun, the telescope comprising:
   a folded telescope assembly that comprises an objective lens, at least two light folding devices, a second lens, and a projection surface;
   a telescope frame having an exterior cross-section which is a circle or polygon and in which the telescope assembly is mounted; and
   a curved support device wherein the curvature of the curved support device supports the telescope frame and permits adjustment of telescope altitude;
   wherein the at least two light folding devices and second lens are structured and arranged so that the image of the sun is projected on an interior surface of the telescope frame, the interior surface being an opposite face from the at least two light folding devices and the second lens, and where the interior surface is observable from outside the telescope frame.

\* \* \* \* \*